(12) United States Patent
Wang et al.

(10) Patent No.: US 10,007,825 B2
(45) Date of Patent: Jun. 26, 2018

(54) POSITIONING SYSTEM USING TRIANGULATION POSITIONING BASED ON THREE PIXEL POSITIONS, A FOCAL LENGTH AND THE TWO-DIMENSIONAL COORDINATES

(71) Applicant: Automotive Research & Testing Center, Lugong (TW)

(72) Inventors: Tian-Li Wang, Lugong (TW); Rong-Terng Juang, Lugong (TW); Chu-Yuan Hsu, Lugong (TW); Yi-Feng Su, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 442 days.

(21) Appl. No.: 14/585,096

(22) Filed: Dec. 29, 2014

(65) Prior Publication Data
US 2016/0189383 A1 Jun. 30, 2016

(51) Int. Cl.
*G06T 7/00* (2017.01)
*G06K 7/14* (2006.01)
*G06K 9/52* (2006.01)
*G06T 7/20* (2017.01)
*G01B 11/00* (2006.01)
*G01B 11/14* (2006.01)
*G06K 9/32* (2006.01)

(52) U.S. Cl.
CPC .......... *G06K 7/1417* (2013.01); *G01B 11/002* (2013.01); *G01B 11/14* (2013.01); *G06K 7/1447* (2013.01); *G06K 9/3216* (2013.01)

(58) Field of Classification Search
CPC .. G01B 11/002; G06K 7/1417; G06K 7/1447; G06K 9/52; G06T 7/0042; G06T 7/2033; G06T 7/60
USPC ........................................................ 348/135
See application file for complete search history.

(56) References Cited

U.S. PATENT DOCUMENTS

| | | | |
|---|---|---|---|
| 6,567,116 B1* | 5/2003 | Aman | A63B 24/0021 348/164 |
| 7,991,194 B2* | 8/2011 | Kim | G06F 17/30241 348/135 |
| 9,134,403 B1* | 9/2015 | Anderson | G01S 1/08 |
| 2004/0167667 A1* | 8/2004 | Goncalves | G01C 21/12 700/245 |
| 2005/0148850 A1* | 7/2005 | Lahm | A61B 5/06 600/407 |

(Continued)

*Primary Examiner* — Jorge L Ortiz Criado
*Assistant Examiner* — Yong Joon Kwon
(74) *Attorney, Agent, or Firm* — DLA Piper LLP (US)

(57) ABSTRACT

A positioning system for positioning a to-be-positioned device includes three or more reference objects each providing individual unique feature information associated with a two-dimensional coordinate. A positioning device includes an image capturing unit obtaining image data of three of the reference objects, and a processing unit obtaining, based on the image data, three pixel positions corresponding respectively to the three reference objects in the image data, obtaining the two-dimensional coordinate of the location of the three reference objects, and estimating a positioning coordinate of the to-be-positioned device using a triangulation positioning method based on the three pixel positions, a focal length used for obtaining the image data and the two-dimensional coordinates.

7 Claims, 9 Drawing Sheets

(56) References Cited

U.S. PATENT DOCUMENTS

| | | | | |
|---|---|---|---|---|
| 2010/0045701 A1* | 2/2010 | Scott | ............... | G01S 5/163 |
| | | | | 345/633 |
| 2010/0302410 A1* | 12/2010 | Naito | ............... | G03B 5/00 |
| | | | | 348/231.99 |
| 2012/0176494 A1* | 7/2012 | Kamon | ............... | G01C 11/06 |
| | | | | 348/135 |
| 2012/0229624 A1* | 9/2012 | Calman | ............... | G06F 19/3456 |
| | | | | 348/135 |
| 2014/0036067 A1* | 2/2014 | Otsuka | ............... | G01S 17/48 |
| | | | | 348/135 |
| 2014/0094136 A1 | 4/2014 | Huang | | |
| 2014/0198206 A1* | 7/2014 | Murray | ............... | G01S 5/16 |
| | | | | 348/135 |

\* cited by examiner

POSITIONING SYSTEM USING TRIANGULATION POSITIONING BASED ON THREE PIXEL POSITIONS, A FOCAL LENGTH AND THE TWO-DIMENSIONAL COORDINATES

FIELD OF THE INVENTION

The invention relates to a positioning system, more particularly to a positioning system for positioning a to-be-positioned device without use of a satellite signal.

BACKGROUND OF THE INVENTION

The Global Positioning System (GPS) is useful in determining an object's location accurately anywhere on the globe, and has thus been used for navigation and for tracking vehicles. A GPS receiver determines its location based on multiple satellite signals. However, when the GPS receiver is located indoors, especially in a basement, the satellite signals received by the GPS receiver may be weak.

SUMMARY OF THE INVENTION

Therefore, an object of the present invention is to provide a positioning system that can effectively position a to-be-positioned device without use of a satellite signal.

According to one aspect of the present invention, a positioning system is configured to position a to-be-positioned device that is movable on or above a floor surface. The positioning system may include a plurality of reference objects and a positioning device. The reference objects are configured to be disposed at respective positions. Each of the reference objects is configured to provide individual unique feature information that is associated with a two-dimensional coordinate of a location thereof with respect to a coordinate system associated with the floor surface.

The positioning device is configured to be mounted to the to-be-positioned device. The positioning device includes an image capturing unit and a processing unit.

The image capturing unit is configured to obtain image data of at least three of the reference objects during a predetermined time period. The image data contains the feature information provided by the at least three of the reference objects.

The processing unit is coupled to the image capturing unit for receiving the image data therefrom. The processing unit is configured to obtain, based on the image data, at least three pixel positions that correspond respectively to the at least three of the reference objects in the image data, obtain the two-dimensional coordinate of the location of the at least three of the reference objects according to the feature information in the image data, and estimate, using a triangulation positioning method, a positioning coordinate of a location of the to-be-positioned device with respect to the coordinate system based on the at least three pixel positions, a focal length of the image capturing unit used for obtaining the image data and the two-dimensional coordinates.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
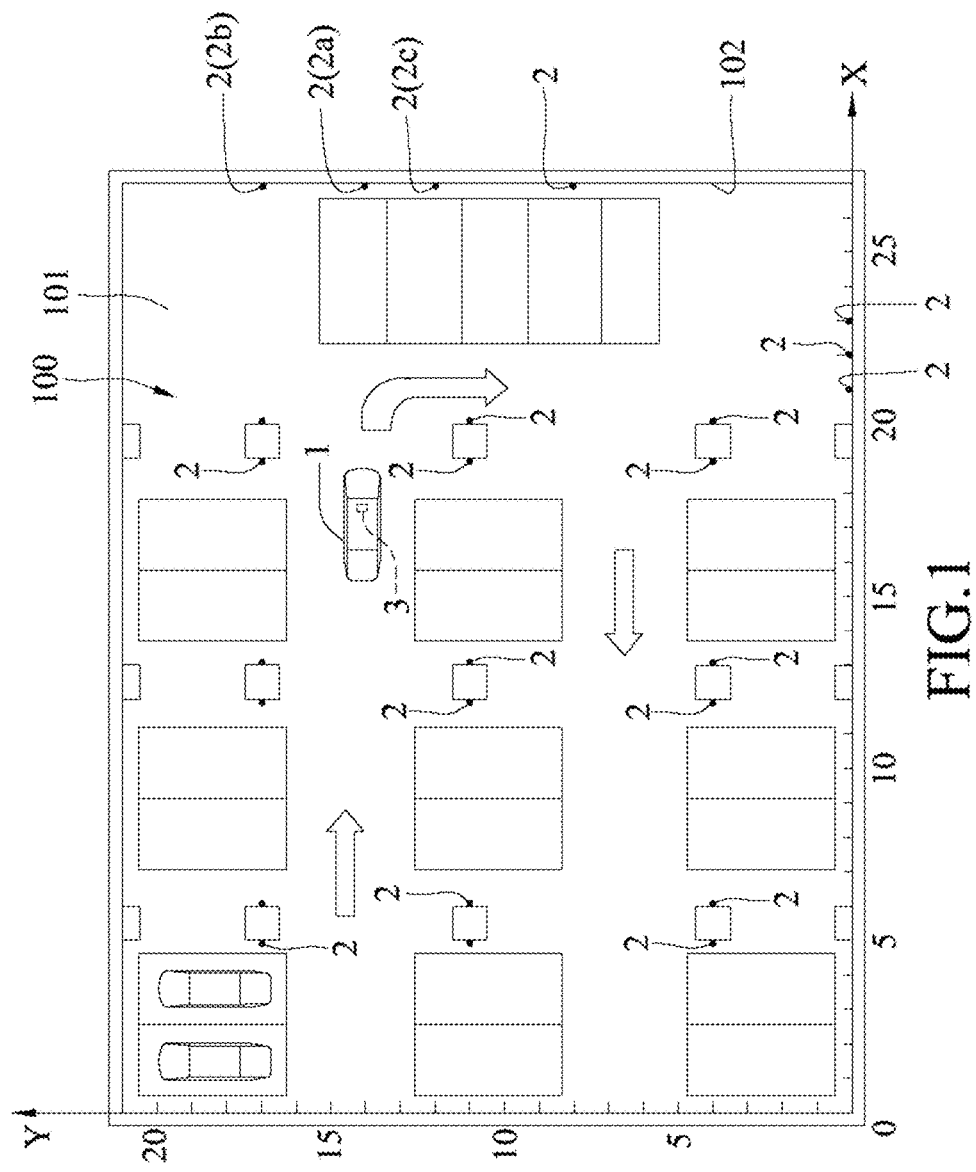
FIG. 1 is a schematic top view illustrating a environment provided with the first embodiment of a positioning system according to the present invention.

Before the present invention is described in greater detail with reference to the accompanying embodiments, it should be noted herein that like elements are denoted by the same reference numerals throughout the disclosure.

Figure 2:
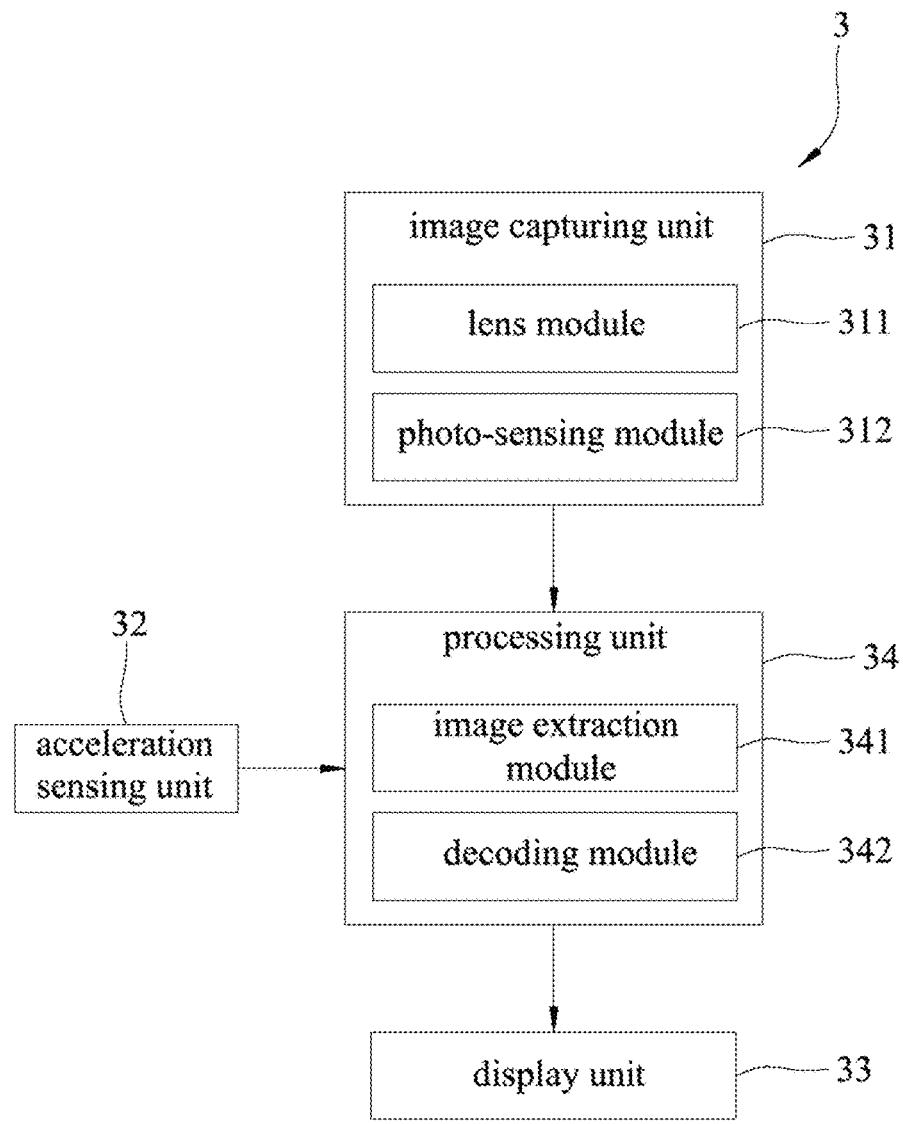
FIG. 2 is a schematic block diagram illustrating a positioning device of the first embodiment.

Referring to FIGS. 1 and 2, the first embodiment of a positioning system according to this invention is used to position a to-be-positioned device 1 that is movable on or above a floor surface 101 in an indoor space 100, for example, an indoor parking area. It should be noted that the positioning system may be used outdoors. In this embodiment, the to-be-positioned device 1 is, but not limited to, a car. The positioning system includes a plurality of reference objects 2 and a positioning device 3.

The reference objects 2 are disposed at respective ordinarily visible positions in the indoor space 100. As shown in FIG. 1, each of the reference objects 2 is disposed on an upright pillar or a wall surface within the indoor space 100. For example, three of the reference objects (2a, 2b, 2c) are disposed on the same wall surface 102. Each of the reference objects 2 provides individual unique feature information that is associated with a two-dimensional coordinate of a location thereof with respect to a coordinate system associated with the floor surface 101. In this embodiment, the coordinate system is, for example, a two-dimensional coordinate system that has an X-axis, a Y-axis, and an XY imaginary plane. The XY imaginary plane is a two-dimensional projection of the floor surface 101, and an origin thereof is located at a lower left corner (see FIG. 1).

Figure 3:
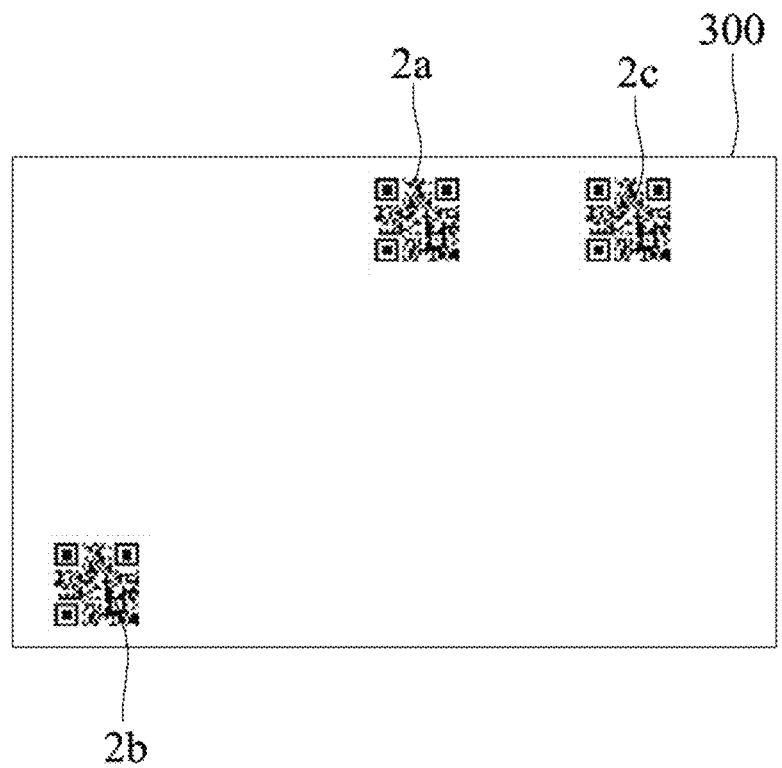
FIG. 3 is a schematic diagram exemplarily illustrating an image of three reference objects captured by an image capturing unit of the positioning device of the first embodiment.

In this embodiment, each of the reference objects 2 includes, for example, a unique two-dimensional barcode that serves as the feature information, and that is, but not limited to, a quick response (QR) code, as shown in FIG. 3. However, in other embodiments, the feature information provided by each of the reference objects 2 may include a one-dimensional barcode. Each of the reference objects 2 may be embodied in the form of, for example, a label printed with the feature information (i.e., QR code) and attached appropriately to the corresponding upright pillar or wall surface in the indoor space 100. Attachment positions of the labels are regarded as the locations of the reference objects 2, respectively.

The positioning device 3 is mounted detachably to the to-be-positioned device 1, and includes an image capturing unit 31, an acceleration sensing unit 32, a display unit 33, and a processing unit 34 coupled to the image capturing unit 31, the acceleration sensing unit 32 and the display unit 33. In this embodiment, the positioning device 3 may be implemented as, but not limited to, a mobile phone.

In this embodiment, the image capturing unit 31 includes a lens module 311, and a photo-sensing module 312 that consists of complementary metal oxide semiconductor (CMOS) components or charge coupled device (CCD) components. The image capturing unit 31 is configured to obtain image data of at least three of the reference objects 2 during each predetermined time period, and to output the image data to the processing unit 34. In this embodiment, the image capturing unit 31 captures one image at a specific time point during every predetermined time period, and the captured image serves as the image data for the corresponding predetermined time period. As an example, as shown in FIG. 3, an image 300 of the reference objects (2a, 2b, 2c) is captured by the image capturing unit 31 when the to-be-positioned device 1 is at a position shown in FIG. 1, and contains the feature information, i.e., the corresponding QR codes, provided by the reference objects (2a, 2b, 2c).

The acceleration sensing unit 32 is configured to sense acceleration of the to-be-positioned device 1 in first and second directions that are perpendicular to each other so as to generate an acceleration signal, and to output the acceleration signal to the processing unit 34. For instance, the acceleration sensing unit 32 may be a gyroscope, and the acceleration signal contains information relevant to the geographical direction of the acceleration.

The processing unit 34 receives the image data from the image capturing unit 31. The processing unit 34 is configured to obtain, based on the image data, at least three pixel positions that correspond respectively to at least three reference objects 2 in the image constituting the image data. The processing unit 34 is further configured to calculate, based on the three pixel positions and a focal length of the image capturing unit 31 used to capture the image constituting the image data, a first angle formed between first and second imaginary lines, and a second angle formed between a third imaginary line and the first/second imaginary line. The first imaginary line passes through the position of a first one of the three reference objects 2 in the indoor space 100 and a position of the lens module 311 of the image capturing unit 31 in the indoor space 100. The second imaginary line passes through the position of a second one of the three reference objects 2 in the indoor space 100 and the position of the lens module 311 of the image capturing unit 31 in the indoor space 100. The third imaginary line passes through the position of a third one of the three reference objects 2 in the indoor space 100 and the position of the image capturing unit 31 in the indoor space 100.

The processing unit 34 is further configured to obtain, according to the feature information in the image data, the two-dimensional coordinate of the location of each of the three reference objects 2 with respect to the coordinate system. In this embodiment, the processing unit 34 includes an image extraction module 341 and a decoding module 342 (see FIG. 2). The image extraction module 341 extracts from the image constituting the image data received from the image capturing unit 31 at least three image portions that correspond respectively to the feature information (i.e., the QR codes in this embodiment) provided by the three reference objects 2. The decoding module 342 decodes the three image portions extracted by the image extraction module 341 to obtain the two-dimensional coordinates of the locations of the three reference objects 2 with respect to the coordinate system.

The processing unit 34 is further configured to estimate a positioning coordinate of a location of the to-be-positioned device 1 with respect to the coordinate system based on the two-dimensional coordinates of the locations of the three reference objects 2 and on the first and second angles using a triangulation positioning method.

Figure 4:
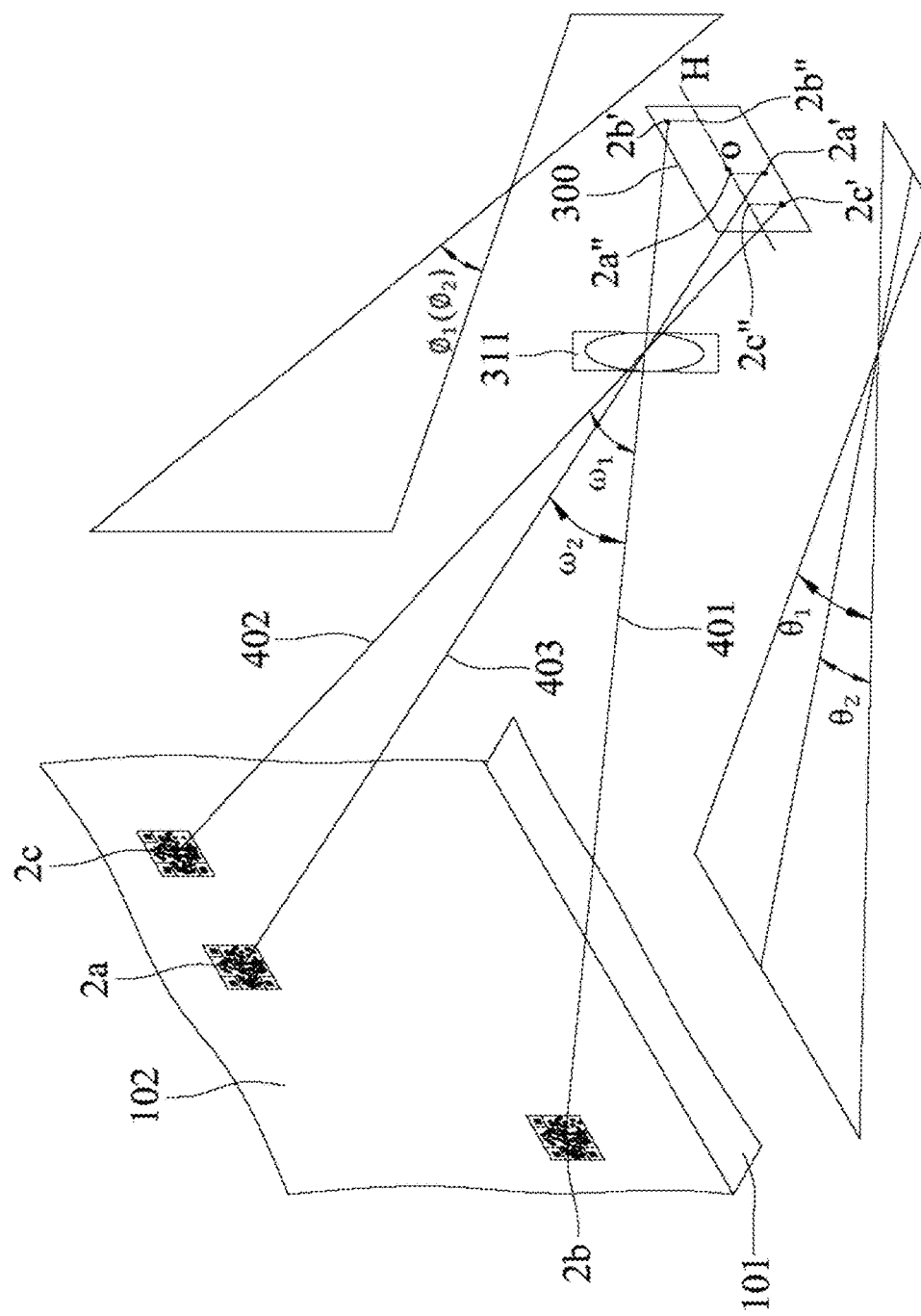
FIG. 4 is a schematic perspective diagram exemplarily illustrating formation of the image of FIG. 3 associated with a lens module and a photo-sensing module of the image capturing unit.
Figure 5:
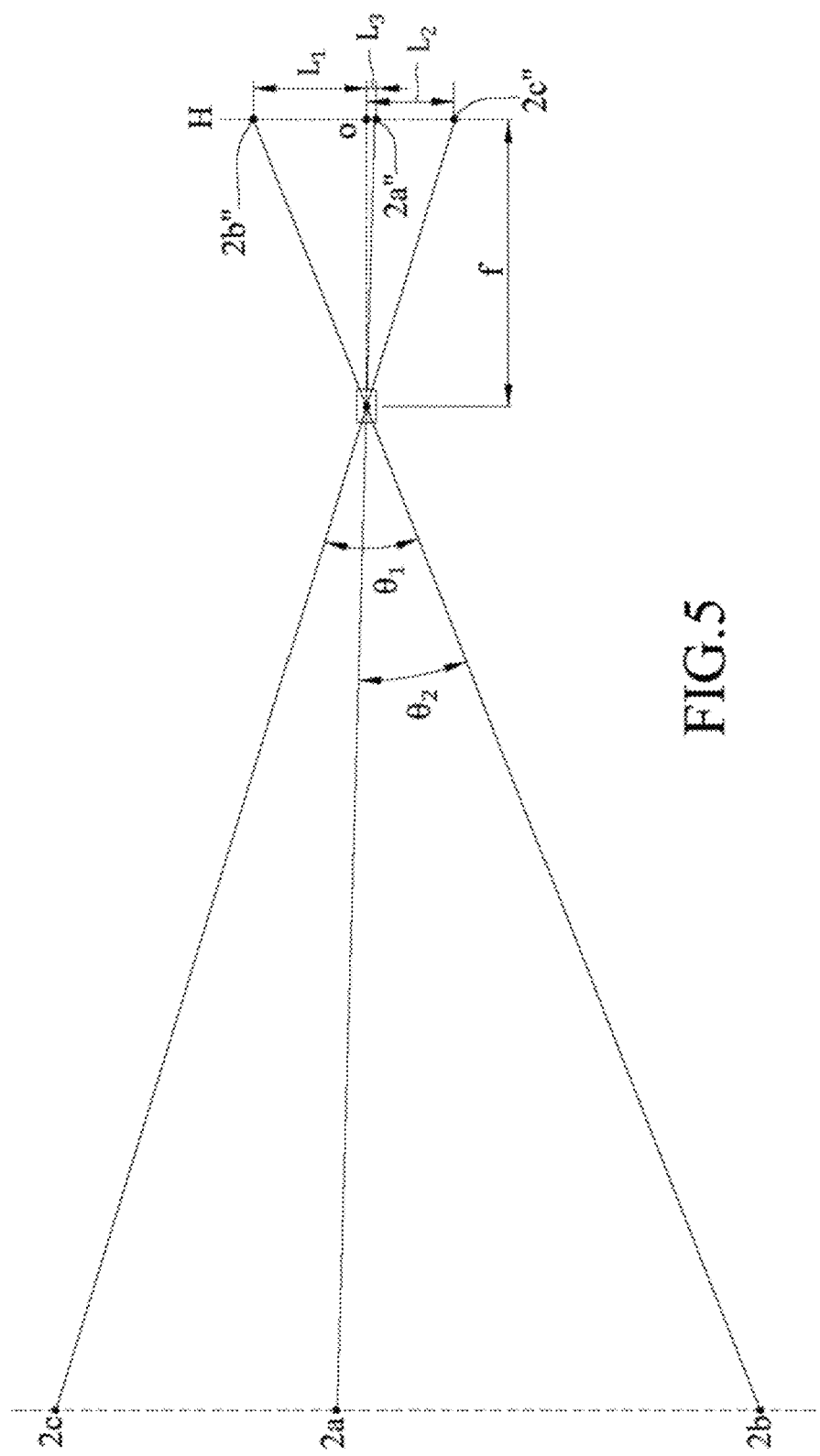
FIG. 5 is a schematic diagram exemplarily illustrating calculation of a location of a to-be-positioned device using a triangulation positioning method.

As an example, referring to FIG. 4, the three reference objects (2a, 2b, 2c) on the wall surface 102 are captured in the image 300 to be respectively at three pixel positions (2a', 2b', 2c'), which are obtained by the processing unit 34. The first imaginary line 401 passes through, for example, the position of the reference object (2b) in the indoor space 100 (see FIG. 1i and the position of the lens module 311 in the indoor space 100. The second imaginary line 402 passes through, for example, the position of the reference object (2c) in the indoor space 100 and the position of the lens module 311 in the indoor space 100. The third imaginary line 403 passes through, for example, the position of the reference object (2a) and the position of the lens module 311 in the indoor space 100. The first angle, represented by ($\omega_1$), is formed between the first and second imaginary lines 401, 402. The second angle, represented by ($\omega_2$), is, for example, formed between the first and third imaginary lines 401, 403. It is noted that each of the first angle ($\omega_1$) and the second angle ($\omega_2$) may be decomposed into two angle components, for example, a horizontal projected angle ($\theta_1$, $\theta_2$) projected onto the XY imaginary plane and a vertical projected angle ($\Phi_1$, $\Phi_2$) projected onto a vertical imaginary plane perpendicular to the XY imaginary plane. Since the positioning coordinate of the location of the to-be-positioned device 1 (see FIG. 1) as estimated by the processing unit 34 is a two-dimensional coordinate, prior to the estimation of the positioning coordinate, the processing unit 34 obtains three projected positions (2a", 2b", 2c") by projecting the three pixel positions (2a', 2b', 2c') onto a horizontal midline (H) of the image 300 that is parallel to the XY imaginary plane. Thereafter, referring further to FIG. 5, a distance (L1/L2/L3) between a center (O) of the image 300 and each of the three projected posit ions (2a", 2b", 2c") is obtained by the processing unit 34. Hence, the horizontal projected angles ($\theta_1$, $\theta_2$) can be obtained by the following equations (1) and (2):

$$\theta_1 = \tan^{-1}\left(\frac{L_1}{f}\right) + \tan^{-1}\left(\frac{L_2}{f}\right) \quad (1)$$

$$\theta_2 = \tan^{-1}\left(\frac{L_1}{f}\right) + \tan^{-1}\left(\frac{L_3}{f}\right) \quad (2)$$

where f represents the focal length of the image capturing unit 31. In addition, the two-dimensional coordinates of the locations of the reference objects (2a, 2b, 2c) obtained by the processing unit 34 are represented respectively by ($x_1$,$y_1$), ($x_2$,$y_2$), ($x_3$,$y_3$). Accordingly, the positioning coordinate of the location of the to-be-positioned device 1, represented by (p,q), can be obtained from the following simultaneous equations (3):

$$\begin{cases} (x_1 - x_2)^2 + (y_1 - y_2)^2 = (p - x_1)^2 + (q - y_1)^2 + (p - x_2)^2 + \\ (q - y_2)^2 - 2\sqrt{[(p - x_1)^2 + (q - y_1)^2][(p - x_2)^2 + (q - y_2)^2]} \cos\theta_2 \\ (x_2 - x_3)^2 + (y_2 - y_3)^2 = (p - x_2)^2 + (q - y_2)^2 + (p - x_3)^2 + \\ (q - y_3)^2 - 2\sqrt{[(p - x_2)^2 + (q - y_2)^2][(p - x_3)^2 + (q - y_3)^2]} \cos\theta_1 \end{cases} \quad (3)$$

In this embodiment, in order to save computation time, the simultaneous equations (3) can be simplified using, for example, Taylor's series expansion, and then the processing unit 34 may calculate (p,q) using simplified simultaneous equations (not shown) through, for example, least squares estimation.

After estimation of the positioning coordinate of the location of the to-be-positioned device 1, the processing unit 34 controls the display unit 33 to display positioning information associated with the positioning coordinate of the location of the to-be-positioned device 1.

It is noted herein that in practice, when an image captured by the image capturing unit 31 contains less than three reference objects 2, the processing unit 34 will ignore said image since the feature information provided by the reference object s) 2 in such image is insufficient for determining the positioning coordinate of the to-be-positioned device 1.

Moreover, during movement of the to-be-positioned device 1, a known interpolation positioning method may also be used by the processing unit 34 to estimate, based on a previous positioning coordinate of a previous location of the to-be-positioned device 1 that was estimated according to the foregoing embodiment for a previous predetermined time period, a current positioning coordinate of a current location of the to-be-positioned device 1 for a current predetermined time period. In this case, the processing unit 34 estimates the current positioning coordinate of the current location of the to-be-positioned device 1 with respect to the coordinate system for the current predetermined time period based on the acceleration signal received from the acceleration sensing unit 32 for the previous predetermined time period, the previous positioning coordinate obtained for the previous predetermined time period, and the length of each predetermined time period.

For a to-be-positioned device 1 that is moving, the positioning system of the first embodiment can obtain, based on the image data of three of the reference objects 2 obtained by the image capturing unit 31 for each predetermined time period, the positioning coordinate of the to-be-positioned device 1 at that predetermined time period using the aforesaid triangulation positioning method. However, the interpolation positioning method cooperating with the previous positioning coordinate corresponding to the previous time period can also be optionally used to estimate the current positioning coordinate of the to-be-positioned device 1 corresponding to the current time period.

Figure 6:
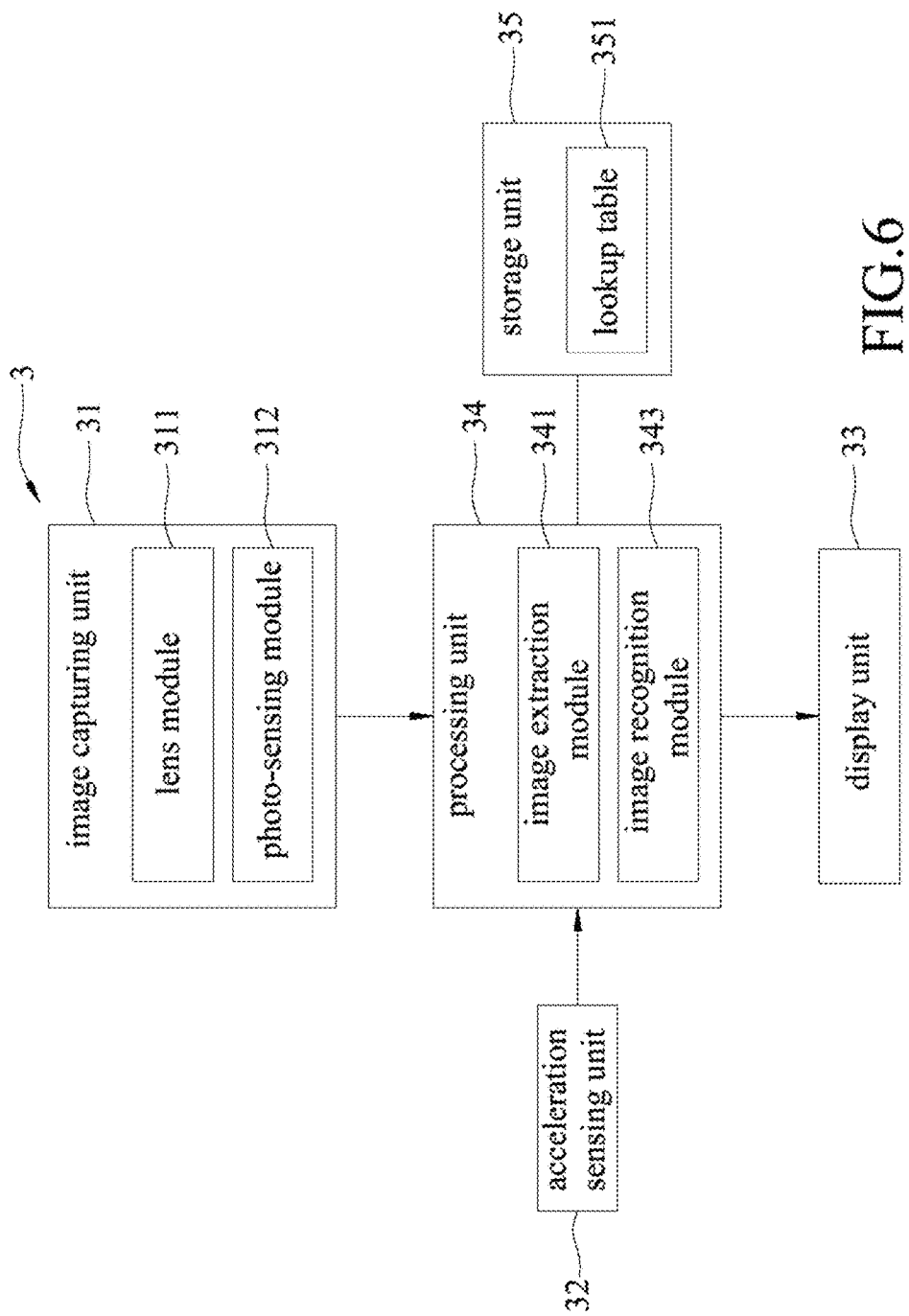
FIG. 6 is a schematic block diagram illustrating a positioning device of the positioning system of the second embodiment according to the present invention.
Figure 7:
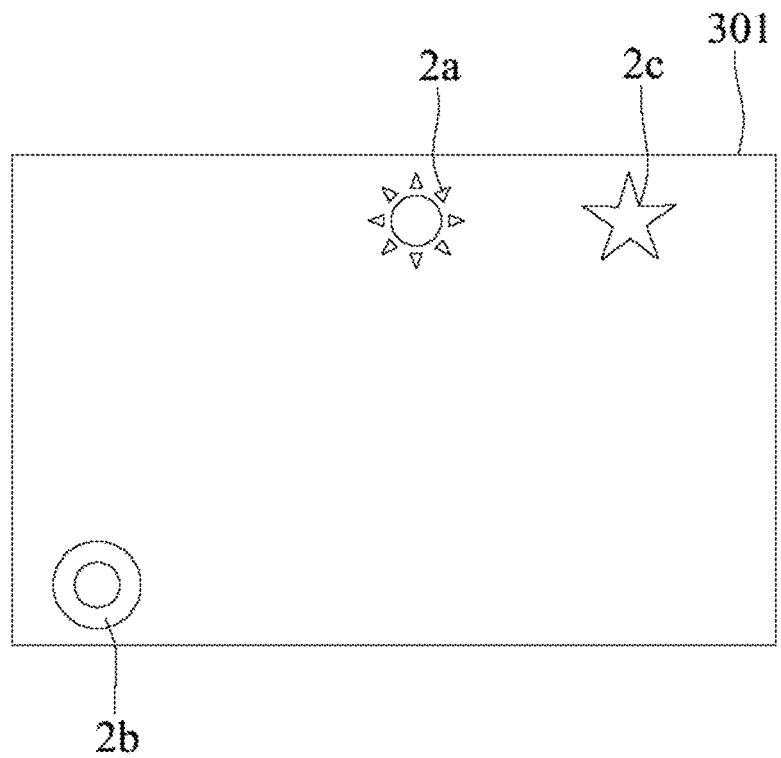
FIG. 7 is a schematic diagram exemplarily illustrating an image of three reference objects captured by an image capturing unit of the positioning device of the second embodiment.

Referring to FIGS. 1, 6 and 7, the second embodiment of the positioning system according to this invention is a modification of the first embodiment. Unlike the first embodiment, each of the reference objects 2 includes a unique feature pattern that serves as the feature information in this embodiment. Therefore, each of the reference objects 2 may be, but is not limited to, a label printed with the corresponding feature pattern.

In addition, the positioning device 3 further includes a storage unit 35 coupled to the processing unit 34. The storage unit 35 stores a lookup table 351 mapping the feature patterns of the reference objects 2 respectively to the two-dimensional coordinates of the locations of the reference objects 2 with respect to the coordinate system. For example, as shown in FIG. 7, an image 301 of three of the reference objects (2a, 2b, 2c) is captured by the image capturing unit 31 when the to-be-positioned device 1 is at the position shown in FIG. 1, and contains the feature information, i.e., the corresponding feature patterns, provided by the three reference objects (2a, 2b, 2c). Take 1 partially and exemplarily shows the lookup table 351 pre-stored in the storage unit 35.

TABLE 1

| Feature Pattern | Two-dimensional Coordinate |
|---|---|
| ✦ | (27, 14) |
| ◎ | (27, 17) |
| ☆ | (27, 12) |
| ... | ... |

Further, in this embodiment, the processing unit 34 of the positioning device 3 includes the image extraction module 341 and an image recognition module 343. The image recognition module 343 recognizes the feature patterns of the three reference objects 2 respectively from the three image portion is extracted by and received from the image extraction module 341. The processing unit 34 obtains the two-dimensional coordinates corresponding to the three reference objects 2 by mapping the feature patterns recognized by the image recognition module 343 respectively to the two-dimensional coordinates in the lookup table 351, which is stored in the storage unit 35.

Figure 8:
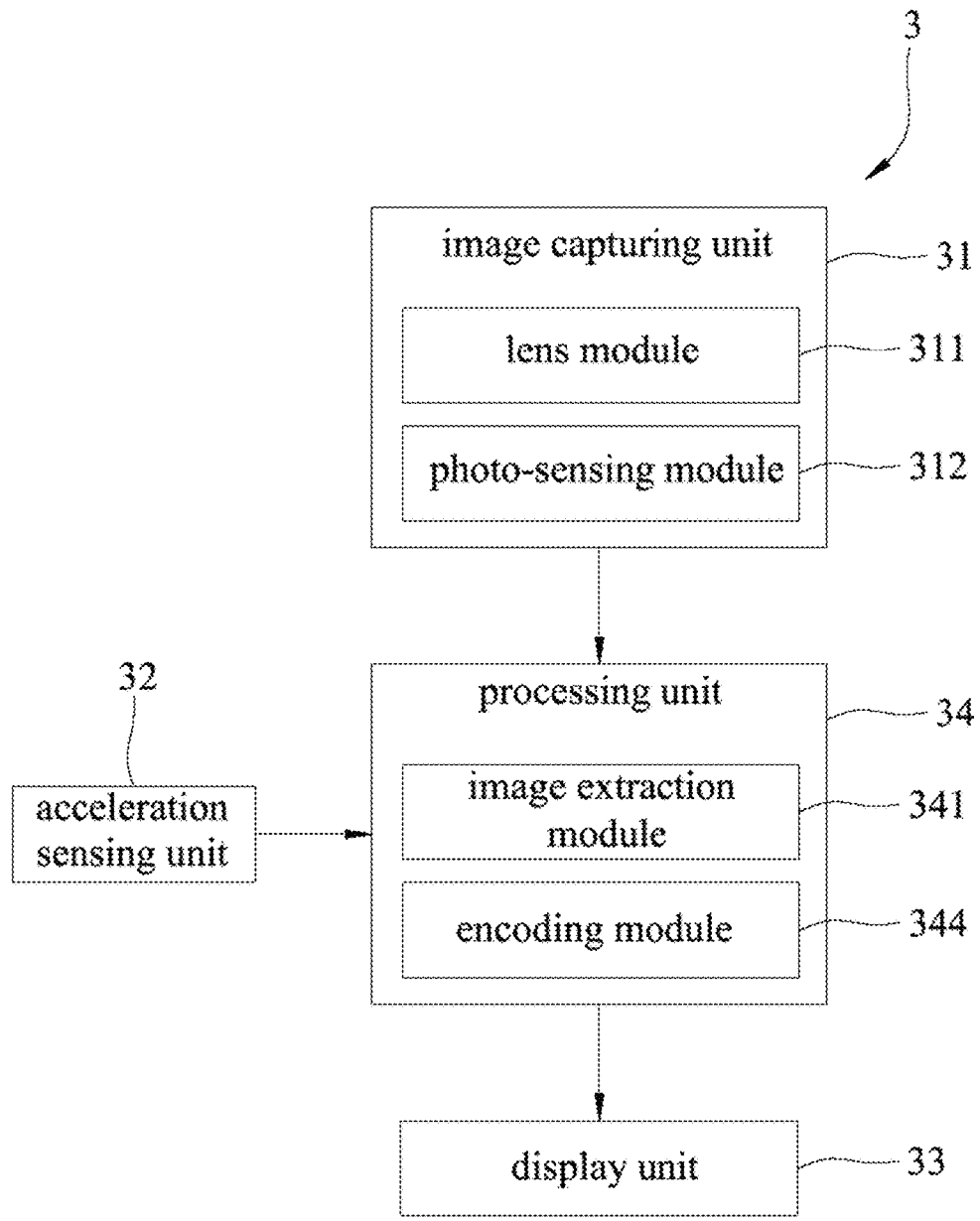
FIG. 8 is a schematic block diagram illustrating a positioning device of the positioning system of the third embodiment according to the present invention.
Figure 9:
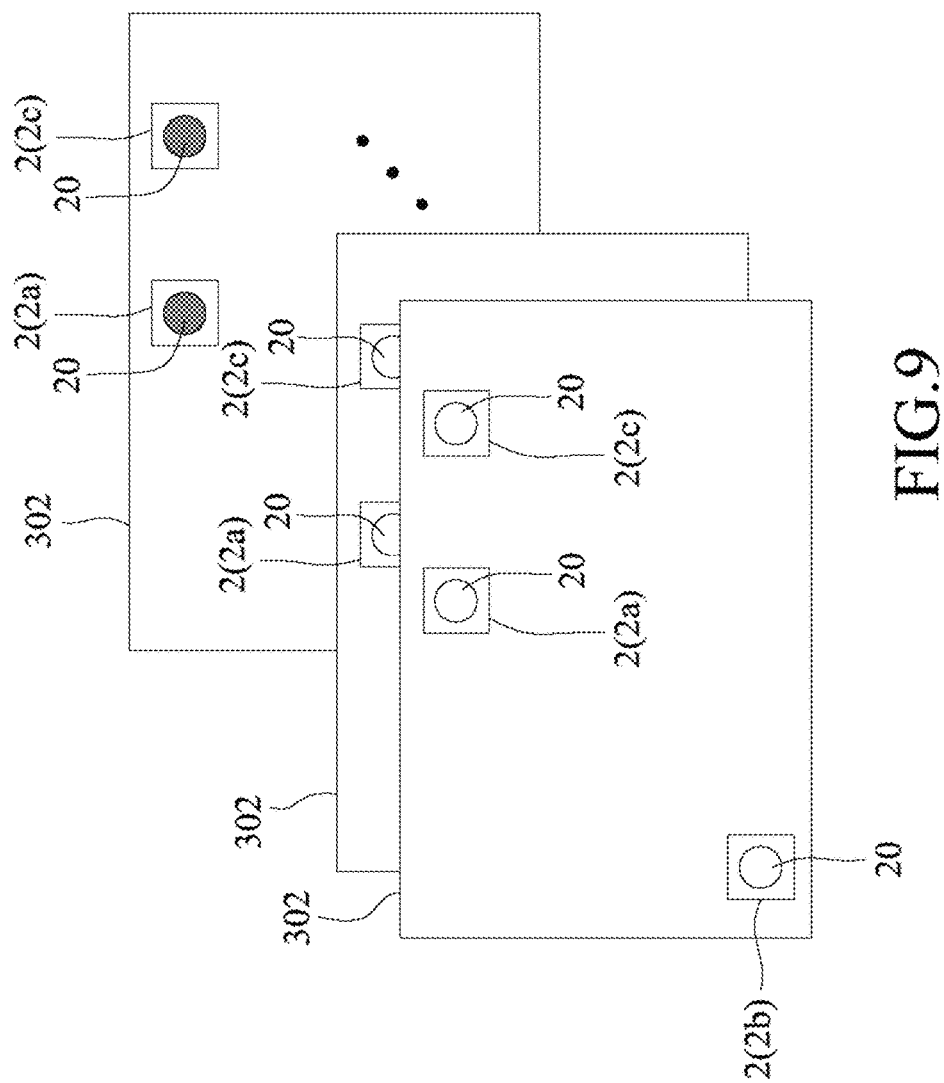
FIG. 9 is a schematic diagram illustrating a series of images of three reference objects captured by an image capturing unit of the positioning system of the third embodiment according to the present invention.

Referring to FIGS. 1, 8 and 9, the third embodiment of the positioning system according to this invention is a modification of the first embodiment. Unlike the previous embodiments, each of the reference objects 2 includes a light emitter 20 that is operable between a light-on state and a light-off state. For example, each of the reference objects 2 may be, but is not limited to, a lamp, and the light emitter 20 of each of the reference objects 2 may include, but is not limited to, a light-emitting diode (LED) unit. It is noted that, in this embodiment, the light emitter 20 of each of the reference objects 2 is configured to operate in one of the light-on state and the light-off state at N different time points during each predetermined time period so as to generate a unique N-bit code data that serves as the feature information provided by the reference object 2 and that represents the two-dimensional coordinate of the location of the reference object 2 with respect to the coordinate system, where N≥2.

In addition, in this embodiment, the image capturing unit 31 of the positioning device 3 captures a number N of images of the three reference objects 2 respectively at the N different time points during each predetermined time period, and sequentially outputs the N images to the processing unit 34. The series of the N images cooperatively serve as the image data obtained by the image capturing unit 31 for the corresponding predetermined time period. In this embodiment, the predetermined time period, in which the image capturing unit 31 captures the N images, is synchronous with the predetermined time period, in which the light emitter 20 operates in one of the light-on sate and the light-off sate at the N time points. For example, as shown in FIG. 9, when N=10, a series of ten images 302 of the reference objects (2a, 2b, 2c3 is captured by the image capturing unit 31 (see FIG. 8) when the positioned device 1 is at the position shown in FIG. 1, and contains the feature information, i.e., the corresponding N-bit code data, provided by the reference objects (2a, 2b, 2c).

Furthermore, in this embodiment, the processing unit 34 of the positioning device 3 includes the image extraction module 341 and an encoding module 344. The image extraction module 341 extracts from each of the N images three image port ions that correspond respectively to the light emitters 20 of the three reference objects 2. Accordingly, a number N of image portions are obtained for each of the three reference objects 2. For each of the three reference objects 2, the encoding module 344 encodes the N image portions that correspond to the light emitter 20 of the reference object 2 into the N-bit code data generated by the light emitter 20 of the reference object 2. For example, the image portion corresponding to the light emitter 20 in the light-on state may be encoded into bit 1 while the image portion corresponding to the light emitter 20 in the light-off state may be encoded into bit 0. Therefore, the two-dimensional coordinate of the location of each of the three reference objects 2 with respect to the coordinate system can be obtained from the N-bit code data encoded by the encoding module 344 using a predetermined decoding manner. For example, according to the predetermined decoding manner, the N-bit code data may be divided into a first code portion, which represents an X-coordinate component of the two-dimensional coordinate, and a second code portion, which represents a Y-coordinate component of the two-dimensional coordinate. As an example, when N=10 (i.e., the N-bit code data is a 10 bit code data), first five bits of the 10-bit code data serve as the first code portion, and last five bits of the 10-bit code data serve as the second code portion. In this case, when the 10-bit code data corresponding to the reference object (2a) is "1101101110", the first code portion is a binary number 11011, and the second code portion is a binary number 01110. Then, the binary number 11011 of the first code portion can be converted to a decimal number 27, and the binary number 01110 of the second code portion can be converted to a decimal number 14. Thus, the two-dimensional coordinate corresponding to the reference object (2a) can be obtained as (27,14) accordingly.

In view of the above, since each of the reference objects 2 is configured to provide individual unique feature information, the processing unit 34 of the positioning device 3 can use the triangulation positioning method, or cooperatively the interpolation positioning method, to position the to-be-positioned device 1. Moreover, the precision of the positioning coordinate of the to-be-positioned device 1 can be effectively improved by increasing the number of the reference objects 2. Thus, the positioning system according to this invention can precisely position the to-be-positioned device 1 in an indoor/outdoor space using a relatively simple configuration.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A positioning system for positioning a device that is movable on or above a floor surface, said positioning system comprising:

a plurality of physical reference objects configured to be disposed at respective positions, each of said physical reference objects being configured to provide individual unique feature information that is associated with a two-dimensional coordinate of a location of the physical reference object with respect to a coordinate system associated with the floor surface; and a positioning device mounted on the device, said positioning device including an image capturing unit configured to obtain image data of at least three of said physical reference objects during a predetermined time period, the image data containing the feature information provided by said at least three of said physical reference objects, and a processor coupled to said image capturing unit for receiving the image data therefrom, said processor being configured to obtain, based on the image data, at least three pixel positions that correspond respectively to said at least three of said physical reference objects in the image data, obtain the two-dimensional coordinates of the locations of said at least three of said physical reference objects according to the feature information in the image data, and estimate, using a triangulation positioning method, a positioning coordinate of a location of the device with respect to the coordinate system based on the at least three pixel positions, a focal length of said image capturing unit used for obtaining the image data, and the two-dimensional coordinates, wherein said processor is further configured to calculate, based on the three pixel positions and the focal length, a first angle formed between a first imaginary line, which passes through a position of a first one of said at least three of said physical reference objects and a position of said image capturing unit, and a second imaginary line, which passes through a position of a second one of said at least three of said physical reference objects and the position of said image capturing unit, and a second angle formed between a third imaginary line, which passes through a position of a third one of said at least three of said physical reference objects and the position of said image capturing unit, and one of the first and second imaginary lines, and estimate the positioning coordinate of the location of the device with respect to the coordinate system based further on the first and second angles, wherein the positioning coordinate (p, q) of the location of the device with respect to the coordinate system is obtained from the following simultaneous equations:

$$\begin{cases} (x_1 - x_2)^2 + (y_1 - y_2)^2 = (p - x_1)^2 + (q - y_1)^2 + (p - x_2)^2 + \\ (q - y_2)^2 - 2\sqrt{[(p - x_1)^2 + (q - y_1)^2][(p - x_2)^2 + (q - y_2)^2]} \cos\theta_2 \\ (x_2 - x_3)^2 + (y_2 - y_3)^2 = (p - x_2)^2 + (q - y_2)^2 + (p - x_3)^2 + \\ (q - y_3)^2 - 2\sqrt{[(p - x_2)^2 + (q - y_2)^2][(p - x_3)^2 + (q - y_3)^2]} \cos\theta_1 \end{cases}$$

where $(x_1, y_1)$, $(x_2, y_2)$ and $(x_3, y_3)$ are the two-dimensional coordinates of the locations of the first, second and third ones of said at least three of said physical reference objects with respect to the coordinate system, respectively, $\theta_1$ represents an angle component of the first angle projected onto an imaginary plane, which is a two-dimensional projection of the floor surface, and $\theta_2$ represents an angle component of the second angle projected onto the imaginary plane.

2. The positioning system as claimed in claim 1, wherein each of said physical reference objects includes a unique barcode serving as the feature information, and said processor is further configured to extract from the image data at least three image portions that correspond respectively to the barcodes of said at least three of said physical reference objects, and decode the at least three image portions respectively into the two-dimensional coordinates of the locations of said at least three of said physical reference objects with respect to the coordinate system.

3. The positioning system as claimed in claim 2, wherein the barcode of each of said physical reference objects is a quick response (QR) code.

4. The positioning system as claimed in claim 1, wherein each of said physical reference objects includes a unique feature pattern serving as the feature information provided thereby, wherein said positioning device further includes a storage unit coupled to said processor for storing a lookup table that maps the feature patterns respectively to the two-dimensional coordinates of the locations of said physical reference objects, wherein said processor is further configured to extract from the image data at least three image portions that correspond respectively to the feature patterns of said at least three of said physical reference objects, and recognize the feature patterns of said at least three of said physical reference objects respectively from the at least three image portions, and obtain the two-dimensional coordinates corresponding to said at least three of said physical reference objects by mapping the feature patterns respectively to the two-dimensional coordinates in the lookup table stored in said storage unit.

5. The positioning system as claimed in claim 1, wherein each of said physical reference objects includes a light emitter that is configured to operate in one of a light-on state and a light-off state at N different time points during the predetermined time period so as to generate a unique N-bit code data that serves as the feature information provided by said physical reference object and that represents the two-dimensional coordinate of the location of said physical reference object with respect to the coordinate system, where N≥2, wherein said image capturing unit captures a number N of images of said at least three of said physical reference objects during the predetermined time period, and sequentially outputs the N images to said processor to constitute the image data;

wherein said processor is further configured to extract from each of the N images three image portions each corresponding to said light emitter of a respective one of said at least three of said physical reference objects, and encode the image portions corresponding to said light emitter of each of said at least three of said physical reference objects into the N-bit code data generated by said light emitter.

6. The positioning system as claimed in claim 5, wherein said light emitter includes a light-emitting diode unit.

7. The positioning system as claimed in claim 1, wherein:

said positioning device further includes an acceleration sensing unit coupled to said processor, said acceleration sensing unit being configured to sense acceleration of the device in first and second directions that are perpendicular to each other so as to generate an acceleration signal, and to output the acceleration signal to said processor; and said processor is configured to estimate, based on the acceleration signal from said acceleration sensing unit, on the predetermined time period, and on a previous positioning coordinate of a previous location of the device that is estimated for a previous predetermined time period, a current positioning coordinate of a current location of the device with respect to the coordinate system for a current predetermined time period.

\* \* \* \* \*